J. H. DEAN.
VOTING MACHINE.
APPLICATION FILED OCT. 30, 1905.
972,513.
Patented Oct. 11, 1910.
10 SHEETS—SHEET 2.
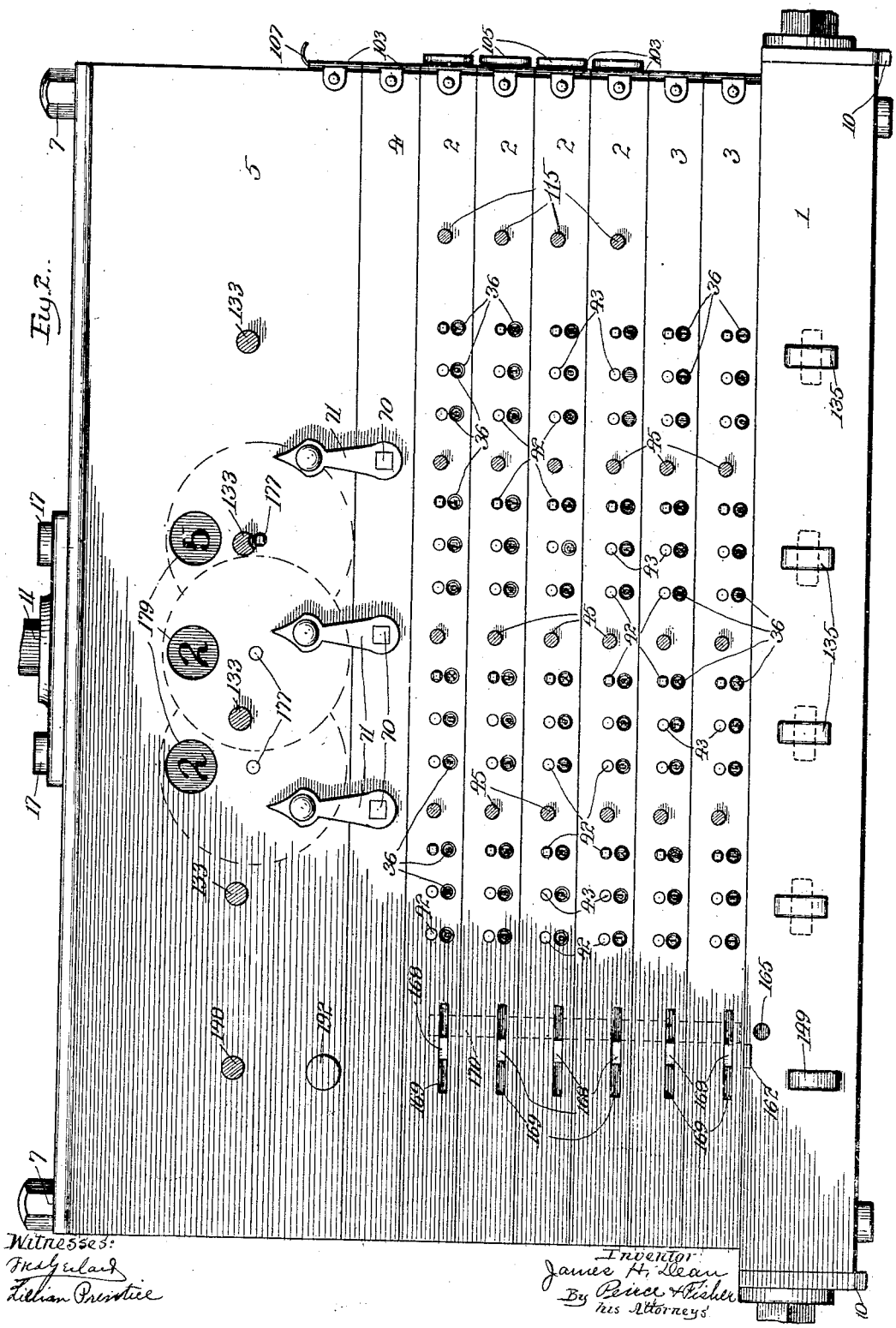

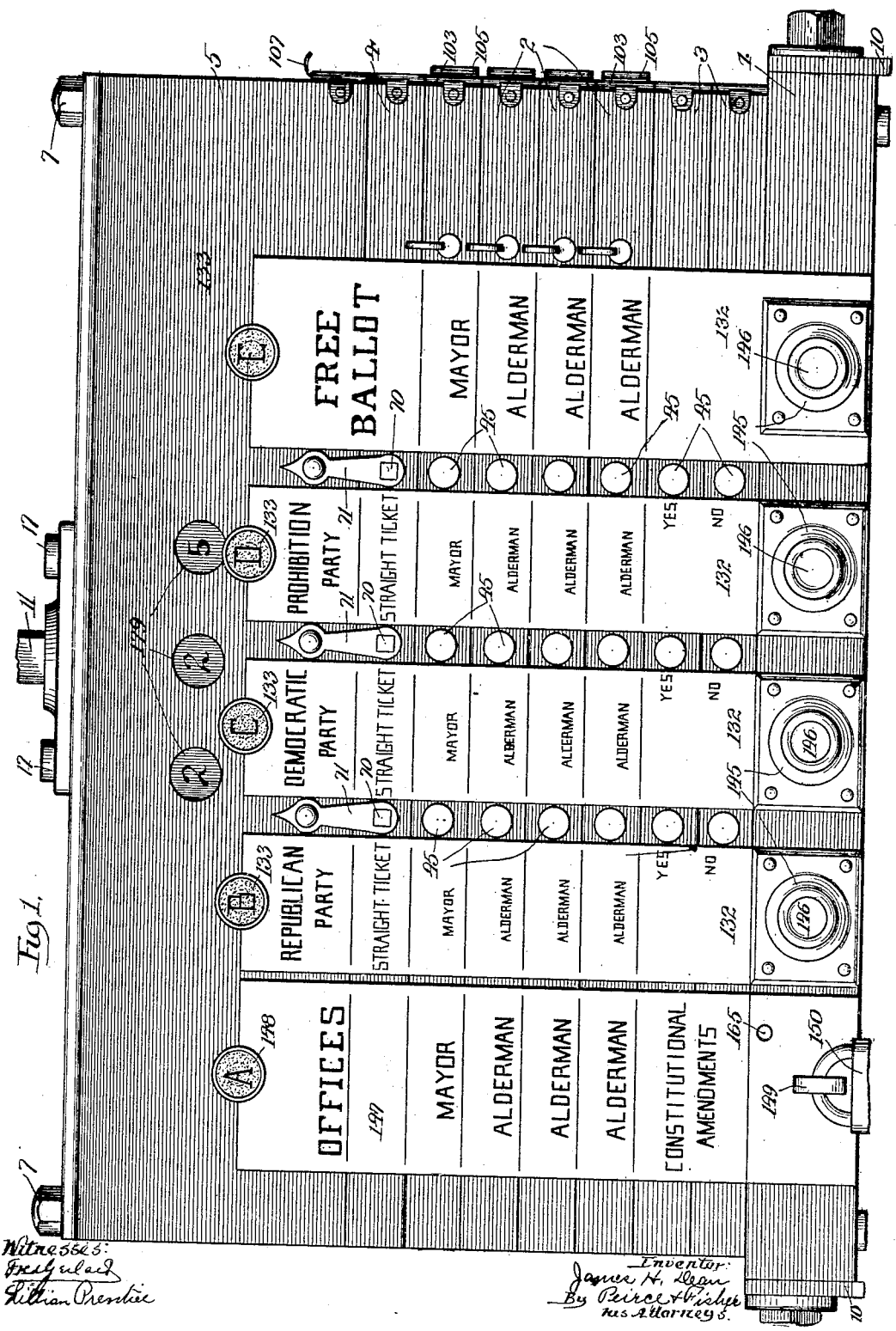

J. H. DEAN.
VOTING MACHINE.
APPLICATION FILED OCT. 30, 1905.
972,513.
Patented Oct. 11, 1910.
10 SHEETS—SHEET 3.
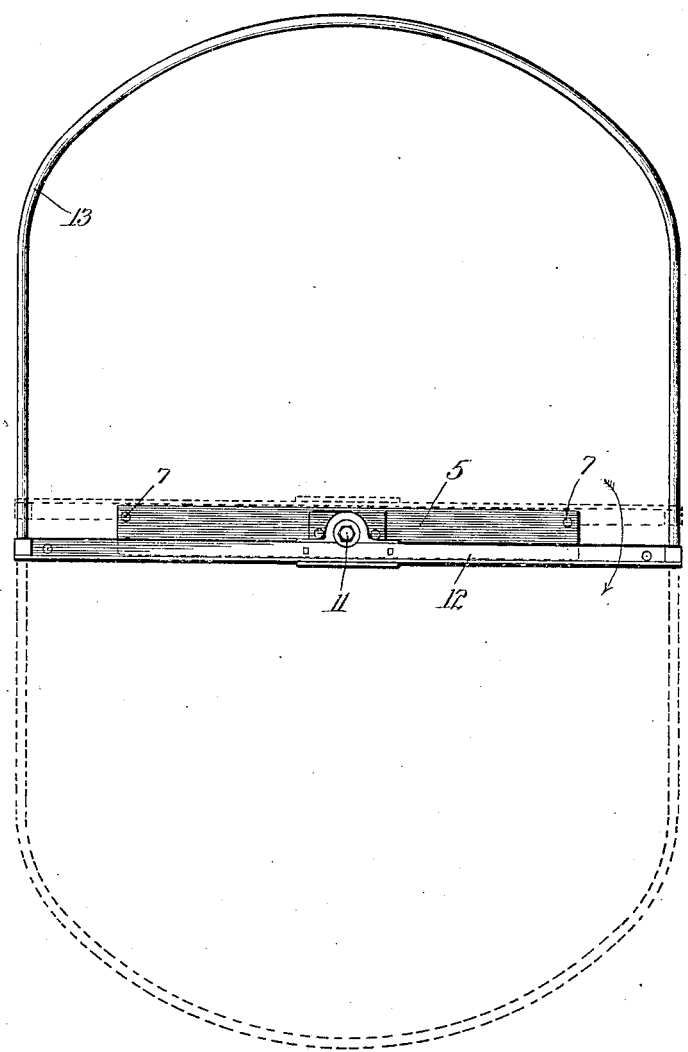
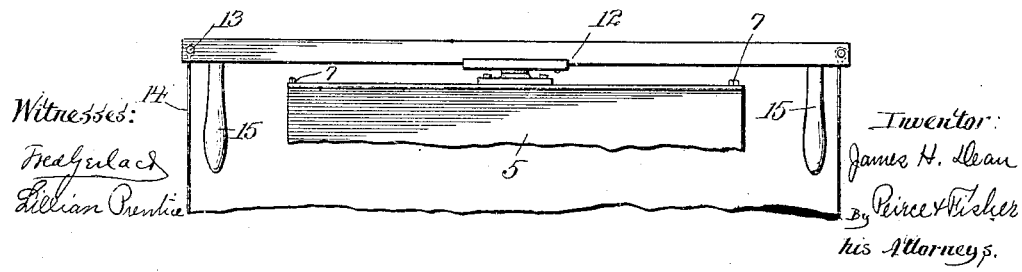

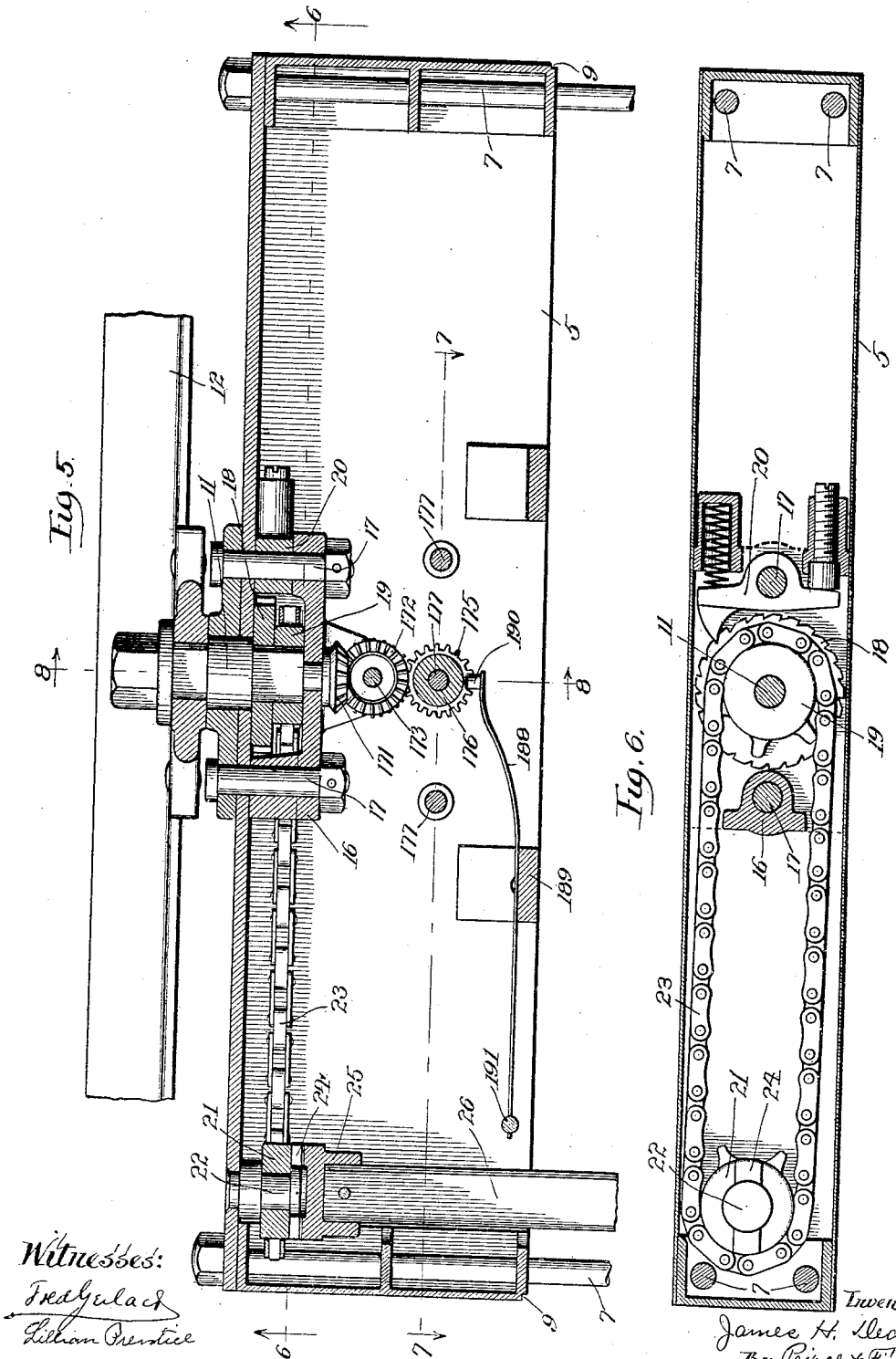

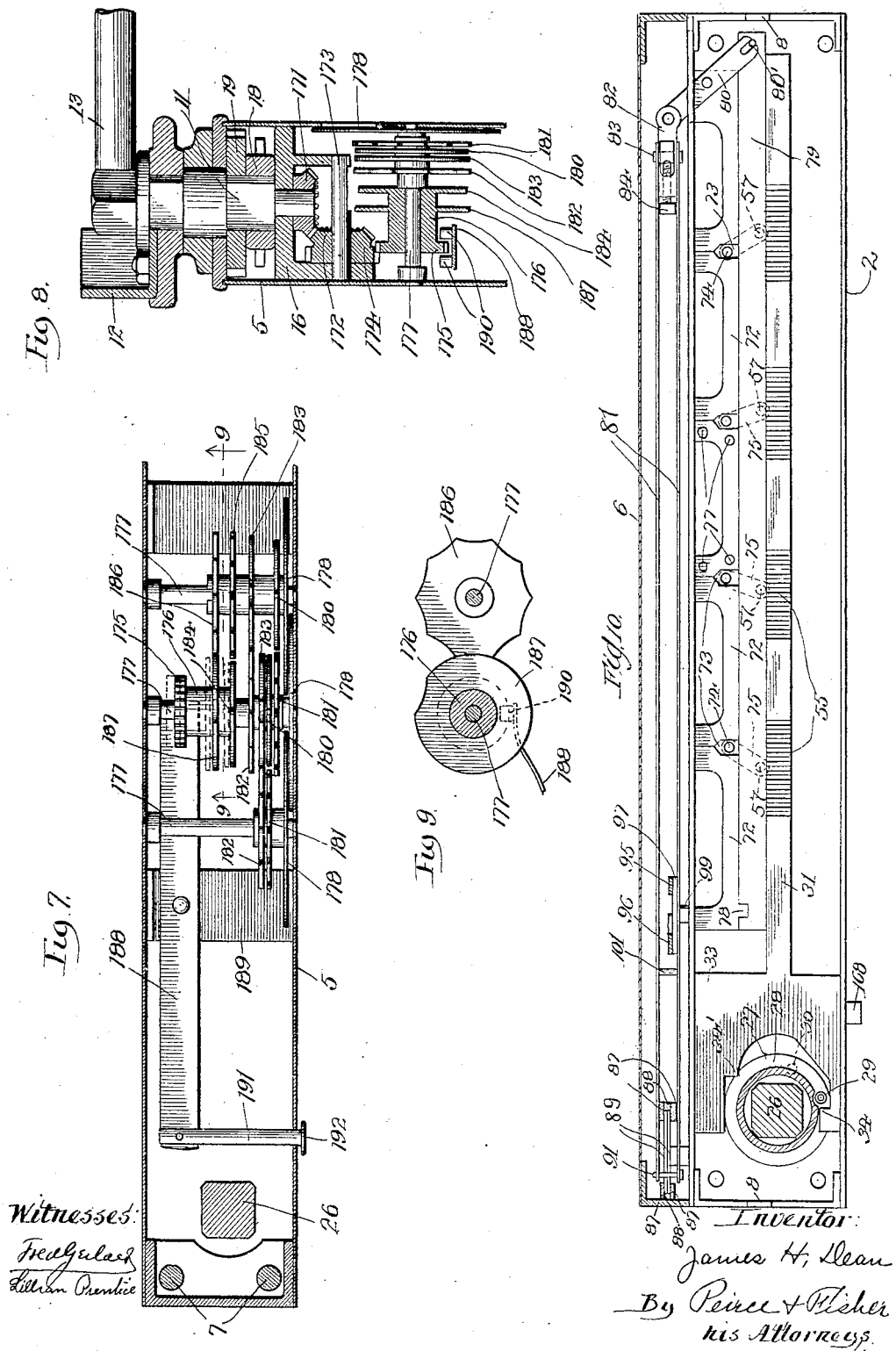

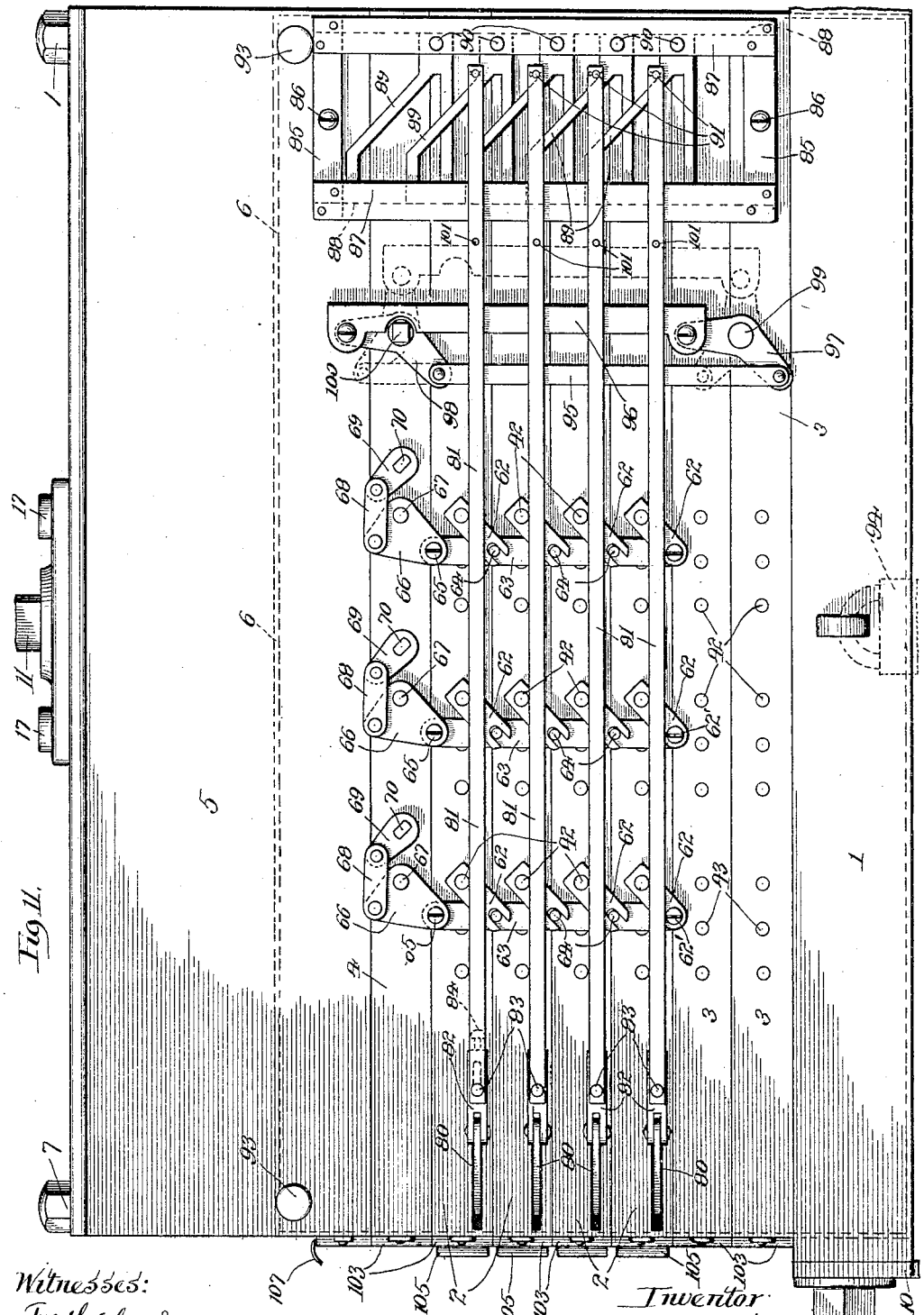

J. H. DEAN.
VOTING MACHINE.
APPLICATION FILED OCT. 30, 1905.
972,513.
Patented Oct. 11, 1910.
10 SHEETS—SHEET 7.
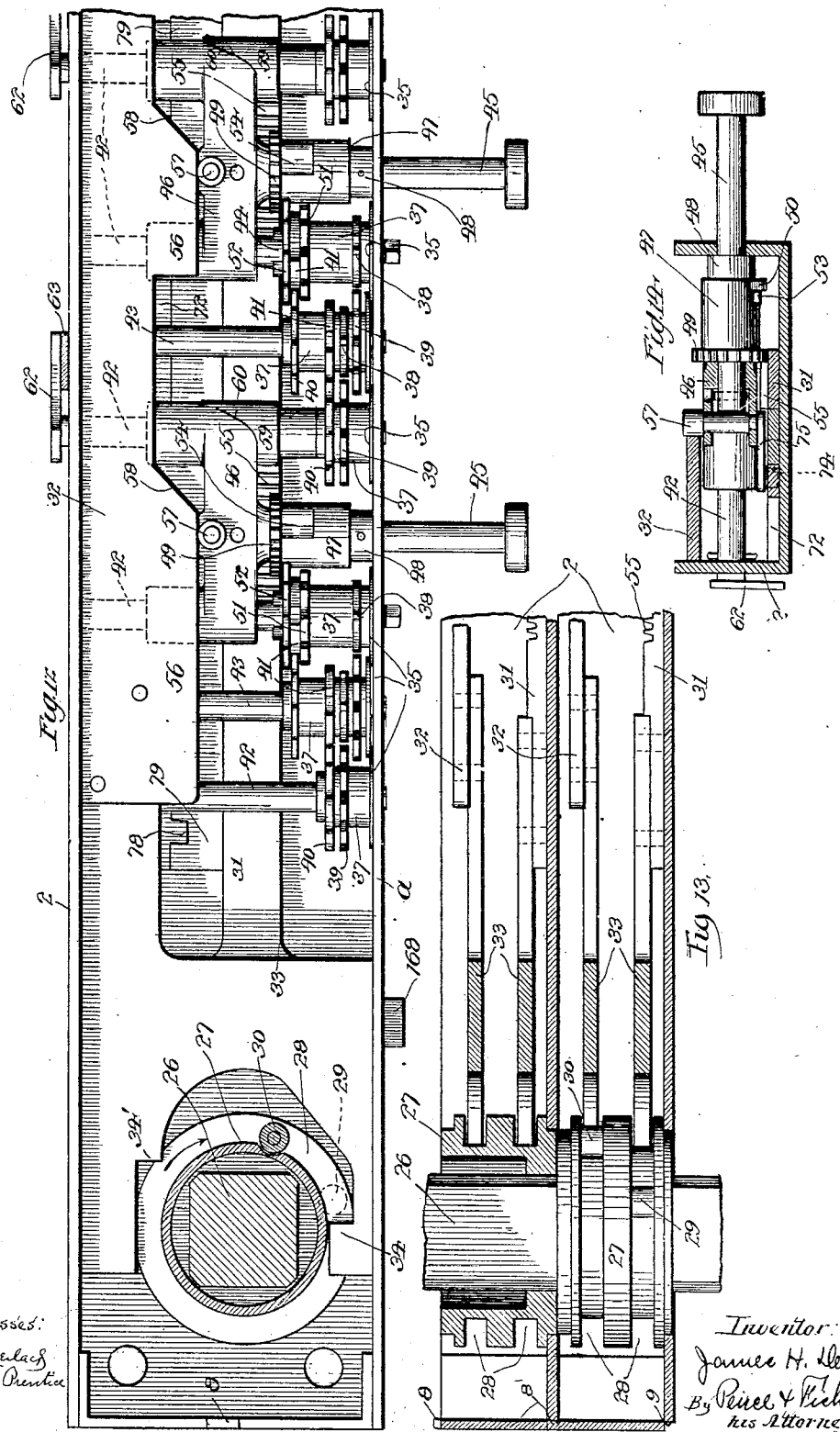

J. H. DEAN.
VOTING MACHINE.
APPLICATION FILED OCT. 30, 1905.
972,513.
Patented Oct. 11, 1910.
10 SHEETS—SHEET 8.
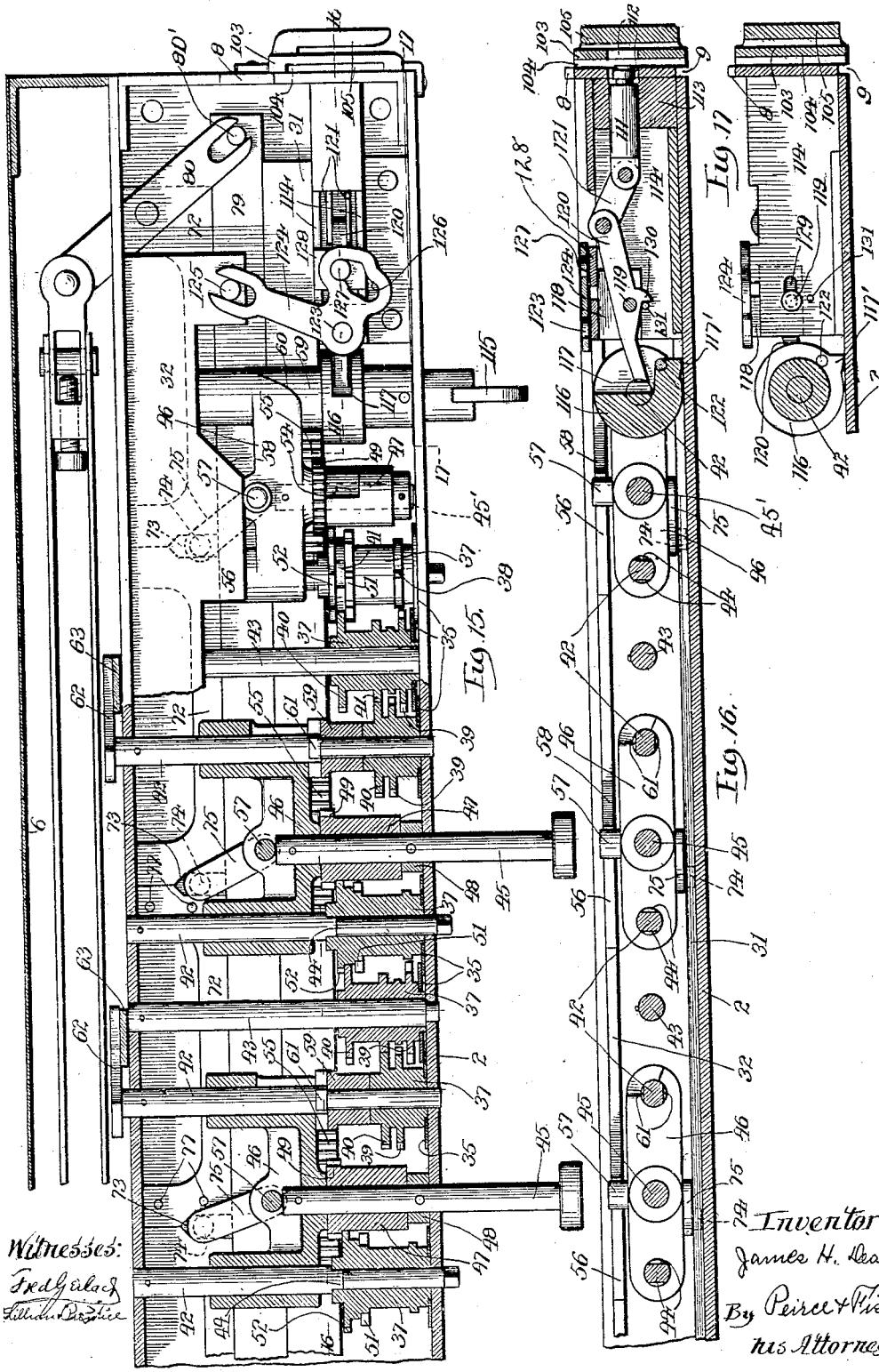
Witnesses:
Fred G Alach
Lillian Bostice
Inventor:
James H. Dean
By Peirce & Fisher
his Attorneys.

J. H. DEAN.
VOTING MACHINE.
APPLICATION FILED OCT. 30, 1905.
972,513.
Patented Oct. 11, 1910.
10 SHEETS—SHEET 9.
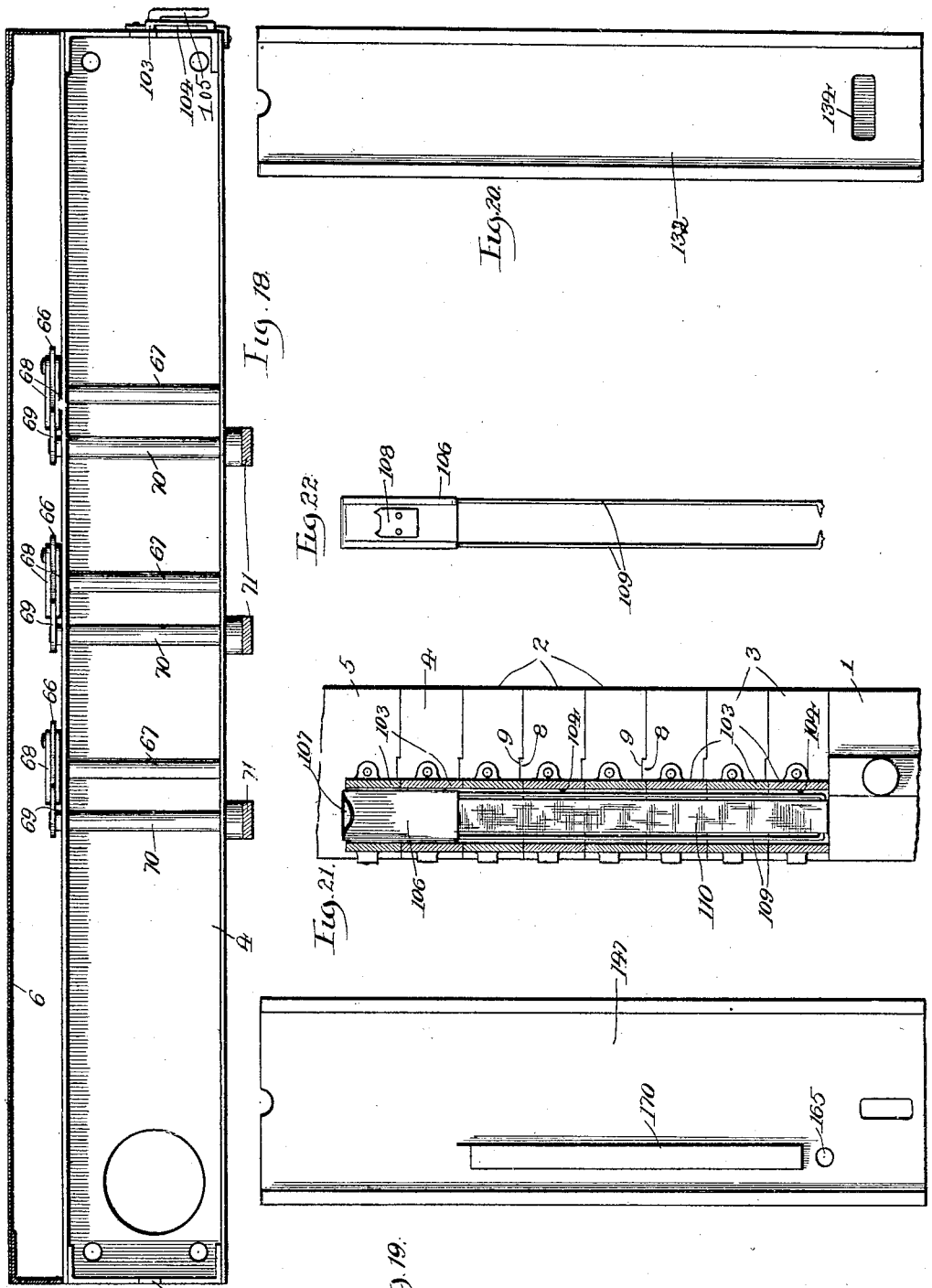

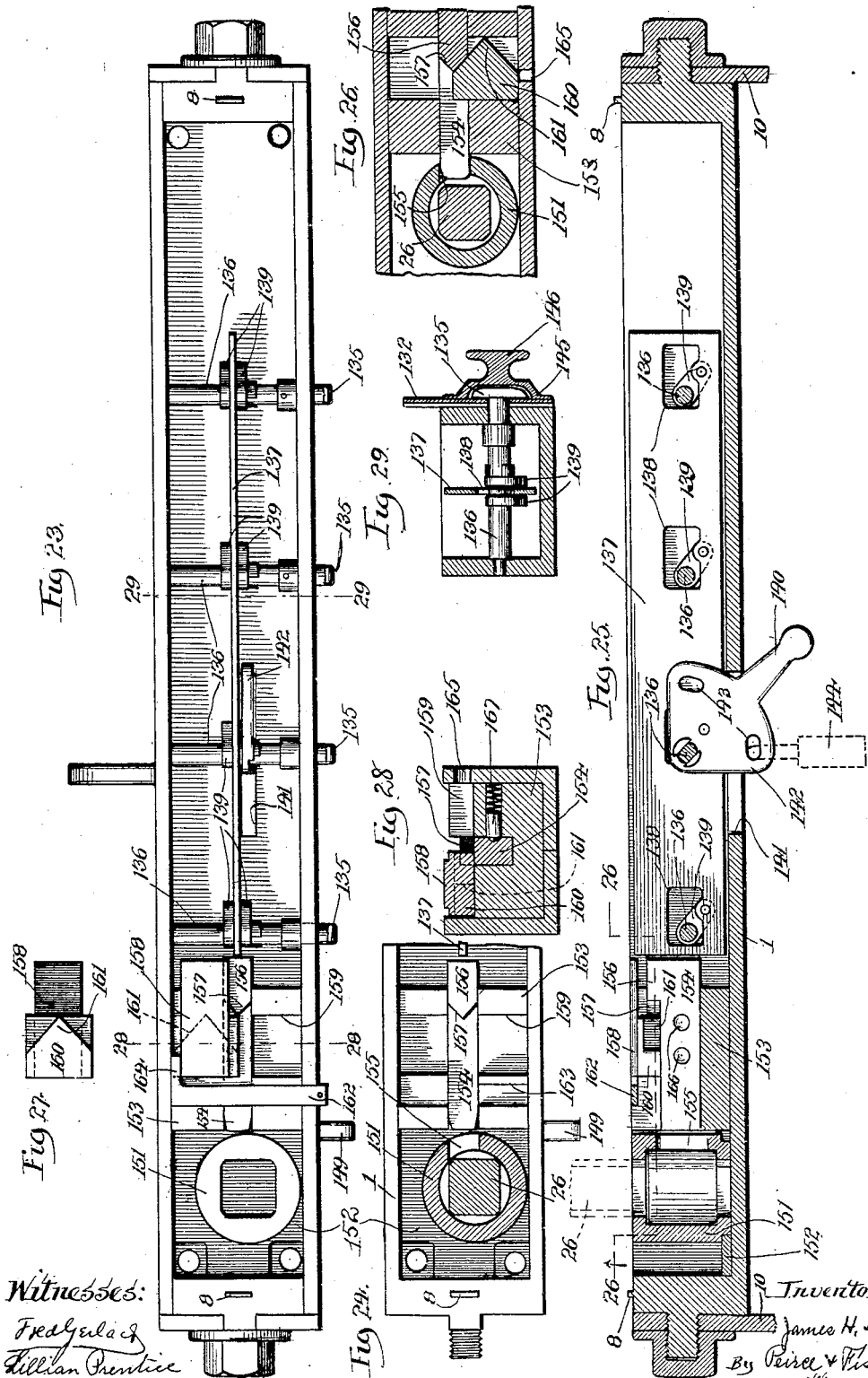

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

972,513.  Specification of Letters Patent.  Patented Oct. 11, 1910.

Application filed October 30, 1905. Serial No. 285,045.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The improvement relates to voting machines and seeks to provide a suitable construction which is provided with both ordinary and straight ticket keys, and in which provision is made for casting irregular ballots.

A further object of the invention is to provide a machine which cannot be improperly manipulated.

The invention consists in the features of construction, combinations and arrangements of parts hereinafter set forth, illustrated in the accompanying drawings and more particularly pointed out in the appended claims.

In the drawings Figure 1 is a view of the face of the machine. Fig. 2 is a similar view with the counters or registers exposed. Fig. 3 is a plan view of the machine. Fig. 4 is a view in elevation of the parts shown in Fig. 3. Fig. 5 is a longitudinal section of the upper portion of the machine. Figs. 6, 7 and 8 are detail sections on lines 6—6, 7—7 and 8—8 respectively of Fig. 5. Fig. 9 is a detail section on line 9—9 of Fig. 7. Fig. 10 is a plan view of one of the unit frames or sections showing the interlocking mechanism. Fig. 11 is a rear view of the machine with the back cover-plate removed. Fig. 12 is a plan view of one of the units or sections of the machine. Figs. 13 and 14 are longitudinal and cross sections respectively of parts shown in Fig. 12. Fig. 15 is a view partially in section of the end portion of one of the machine units. Figs. 16 and 17 are detail sections respectively on lines 16—16 and 17—17 of Fig. 15. Fig. 18 is a plan view of the straight ticket section of the machine. Figs. 19 and 20 are rear face views of the office and party group plates respectively. Fig. 21 is an end view of the machine with parts shown in section. Fig. 22 is a view of the ribbon-holder employed as part of the free ballot mechanism. Fig. 23 is a plan view of the lower section or unit of the machine. Fig. 24 is a similar view of one end of the same with certain parts omitted and other parts shown in section. Fig. 25 is a longitudinal section of the lower section of the machine. Fig. 26 is a detail section on line 26—26 of Fig. 25, looking in the direction of the arrow. Fig. 27 is an inverted plan of the lock tripping dog. Figs. 28 and 29 are detail sections on lines 28—28 and 29—29 of Fig. 23.

The machine shown in the drawings, like that set forth in my prior Patent No. 636,730 of November 7, 1899, is made up of units or sections, each unit having counters for all of the candidates for a given office. It is to be understood however that numerous features of the present invention are not dependent on the sectional or unit feature and may be applied to machines of other types.

The machine comprises a base section and a top section, with as many units interposed as are required for the number of offices to be filled at an election. The units each containing a group of counters for a single candidate are thus arranged in horizontal rows while the party tickets are arranged in vertical rows.

The frame of the machine is preferably formed of sheet metal and comprises the base frame 1, the unit or section frames 2, the amendment sections 3, the straight ticket section 4 and the top section 5, together with a sheet metal back plate 6. The sections or unit frames may be held together in any suitable way, as by means of through bolts 7. Preferably also, the sections are provided with interlocking tongues and notches 8 and 9, as indicated. The machine as a whole is carried at a suitable height above the floor upon legs or supports 10, the upper portions only of which are shown in the drawings.

A short shaft 11 is journaled in vertical position upon the upper, central portion of the top frame 5 and a supporting arm 12 is centrally fixed to the upper projecting end of the shaft. The ends of the support or arm 12 extend beyond the ends of the machine and a laterally extending bow-shaped rod 13 (see Figs. 3 and 4) fixed at its ends to the support or arm 12, carries a curtain or shield 14 which forms the booth of the machine. Near its ends the arm 12 is provided with depending handles 15 by which the booth may be rotated about the machine to alternately inclose and display the face of the machine which carries the voting keys.

The short shaft 11 extends through the cover plate of the top section 5 and it is journaled at its lower end in its bracket 16, that is held in place by bolts 17. Below the top of the upper section 5 and, in the bracket 16, are arranged a ratchet wheel 18 and a sprocket 19 which are fixed to the shaft 11. A spring-held pawl 20 is swiveled on one of the bolts 17, engages the teeth of the ratchet 18 and prevents the rotation of the shaft 11 and booth connected thereto in one direction.

A sprocket wheel journaled on a stud 22 at one end of the top section 5, is connected to the sprocket 19 by a chain 23. The lower face of the sprocket 21 is provided with a shoulder or key 24, which is adapted to fit a corresponding key-way formed in a crown piece 25 upon the upper end of the motor shaft 26. This shaft 26 is square as shown, and extends through all of the units or sections of the machine. Within each unit section is arranged a sleeve 27 having a square hole to fit the motor shaft and each sleeve has an upper, lower and central flange as shown, forming grooves 28 within which are set the tappet pins 29 and 30.

The central unit frames or sections are preferably channel or trough-like, that is to say, the bottoms of the sections are closed and their tops opened. On the bottom of each section is arranged to slide a bar 31 for operating the counter actuators of that section. At the top of the unit is arranged a longitudinally extending restoring bar 32 for locking the voting keys and for restoring them to normal position. At the end of the unit frame each of these bars is provided with a square head 33 which snugly fits between the front and back portions thereof and which is provided upon one side with a hook 34 and on its opposite side with a shoulder 34' (see Figs. 11 and 12). The tappet pins 28 and 29 upon the motor sleeve 27, coöperate with the hooks 34 and shoulders 34' to shift the actuating bar and restoring bar back and forth. The motor shaft rotates in the direction of the arrow shown in Fig. 12 and it should be noted, that the tappet pin 29 for operating the actuator bar, is in advance of the pin 30, which operates the restoring bar.

Each of the office sections or units is preferably provided with six or seven counters or registers. Each of the counters is provided with three dials 35 and each dial has ten figures which show through openings 36 in the front plate of the unit frame. Each dial is attached to a sleeve 37 carrying gears by which one revolution of the unit dial is connected to the tens dial so as to advance it one step and in like manner advance the hundreds dial when the tens dial has completed a revolution. The units and tens sleeves are provided with single actuator teeth 38 which coöperate with intermittent gears 39 on the tens and hundreds sleeves respectively. The tens and hundreds sleeves are provided with locking wheels 40 which coöperate with cylindrical surfaces 41 upon the tens and units sleeves respectively, and these surfaces are mutilated at points opposite the actuator teeth 38 so as to free the corresponding locking wheel 40 when the corresponding actuator tooth 38 is in engagement with the gear 39. This particular arrangement of operating gearing for the counter dials is set forth in prior application filed by me No. 742,031, December 30, 1899, and need not be more fully described here.

The units and hundreds sleeves 37 are mounted upon the forward reduced ends of cross studs 42 while the tens sleeve is mounted upon the forward ends of the cross studs 43, which are reduced at their extreme forward ends (see Fig. 15). These studs are free to turn and are held in place by pins which are driven through the same just inside of the back plate of the unit frame after the studs are inserted. The stud 42 upon which the unit sleeve is placed, is provided with a square part or key 44 upon which the unit sleeves 37 fits. The end of this stud projects beyond the end of the face of the frame and is made square to receive a crank or tool by which the counter wheels, when released from their actuator, may be returned to zero.

The several voting keys 45 extend through openings in the front of the unit frame and the rear ends are connected to U-shaped slides 46, each of which is freely mounted upon two of the pins 42.

The actuator for each counter comprises a cylindrical sleeve 47 loosely mounted upon the key 45, but so arranged between the slide 46 and a collar 48 pinned to the key, that it is compelled to shift longitudinally therewith. The actuator is provided at one end with a spur gear 49 by which it is turned, and at its other end a tooth 50 (see Fig. 14) adapted to engage the intermittent gear 51 upon the unit sleeve 37 and turn the counter one number. The tooth 50 is however normally out of line with the gear 51 so that this operation occurs only after the actuator has been pushed in by the key to bring the tooth into the plane of the gear on the unit sleeve. A locking wheel 52 upon the units sleeve 37, coöperates with the cylindrical portion of the actuator and the latter is provided with a mutilated portion 53 in line with tooth 50 so as to clear the teeth of the locking wheel when the tooth is in engagement with gear 51. The actuator sleeve 47 is also provided with a mutilated portion 54 opposite the tooth 50. This mutilated portion cannot be brought opposite the locking wheel 52 in the ordinary operation of the machine, but as hereinafter explained, by moving the actuators thereon an excessive distance this mutilated portion may be brought opposite the locking wheel to the counters and the return thereof to zero position.

The actuator bar 31 is provided with rack teeth 55 which are wide enough to engage the actuator pinions 49 whether the latter are pushed in or not. As the voter approaches the machine, arm 12 and booth curtain 14 are swung around to inclose its face and this movement will rotate the motor shaft 26 through one half of the revolution and shift the actuators into such position that, when the voter retreats from the machine and the revolution of the booth curtain and motor shaft is completed, the counter or counters for which the actuator or actuators have been set by means of the voting keys will be rotated to register the vote.

The key-locking and restoring bar 32 is provided with shoulders or lugs 56 on its front edge which coöperate with pins 57 to normally hold the keys 45 in locked position. Pins 57 extend through the slides 46 as shown, just behind the rear ends of the keys. As the voter approaches the machine and the booth is turned to inclose its face, pin 30 will engage the hook 34 and shift the restoring bar to move the lugs 56 away from pins 57, so that the keys may be moved to set the corresponding actuators. As the voter retreats from the machine, the tappet 30 coöperates with the shoulder 34' to shift the restoring bar to the opposite direction and the cam-faces 58 of the lugs 56 engage the pins 57 on the slides and force the keys and actuators back to normal locked position.

It should be noted that the movement of the motor shaft 26 is always in the same direction inasmuch as the centrally mounted booth always revolves in one direction and can only revolve in one direction about the machine. The actuator bar tappet 29 in advance of the restoring bar tappet 30, insures that the actuator bar will be operated first both when the voter advances to and when he retreats from the machine. If the restoring or locking bar were operated first as the voter approaches the machine, he could then push in one or more of the keys and actuators before the actuator-bar was shifted, so that, when this did occur, one or more of the counters would be moved back one number. Of course, the actuator-bar must be operated before the restoring bar as the voter leaves the machine, for otherwise the counters would not properly register the ballot cast.

It will be noted that each of the key-actuated slides 46 is mounted upon the cross-pin 42 carrying the unit sleeve of the register controlled by the slide and upon a cross-pin 42 which carries the hundreds sleeve of the next adjacent register. The hundreds sleeves are loose upon the pins while, as stated, the units sleeves are fixed to the pins. On the pins 42 behind the hundreds sleeves, but in front of the slides, are arranged cams 59 which are provided with inclined spiral cam faces 60 abutting against corresponding cam faces on the slides 46. These cams are provided with square portions fitting the square faces 61 on the front ends of the larger part of the pins 42 (see Fig. 15). The rear ends of the pins or rock shafts 42 project beyond the rear wall of the unit sections and are provided with crank arms 62. The crank arms 62 of the lowermost candidate group section, are provided by screws 62' to the lower ends of straight ticket bars 63 (see Fig. 11), while the other crank arms are provided with open-ended slots engaging pins 64 on the straight ticket bars. The upper ends of the straight ticket bars are connected by pivot screws 65 to triangular shaped pieces 66, which are carried on pivot pins 67 journaled in the straight ticket unit or section 4 (see Fig. 18). By providing the greater part of the crank arms 62 with open-ended slots, they may be readily connected and disconnected in assembling the units of the machine or taking them apart, but inasmuch as the straight ticket bars 63 are securely connected at their ends to the lower rock-arms 62, and to the triangular rocking pieces 66 by the screws 62 and 65, the crank-arm 61 cannot be disengaged from the straight ticket bar during the operation of the machine.

The triangular shaped pieces 66, which are in effect bell-cranks, are connected by links 68 to the rock-arms 69 mounted on the rock-shafts 70. These shafts are journaled in the straight ticket unit or section 4 and are provided on their front ends with straight ticket actuating-keys or cranks 71, which when one of these keys or handles is turned by the voter to his left as he faces the machine, will operate the straight ticket bar 63, pins 42 and cams 59 to shift all of the slides, counter-actuators and keys which belong to the candidates of that particular party or political ticket. The operation of the actuators thus shifted will be controlled, as before, by the actuating and restoring bars in the several office group sections and the restoring of the separate slides and keys will also serve to restore any one of the straight ticket keys and connected parts which may have been operated. It will be observed however, that while the operation of the straight ticket key and bar effects the shift of all of the candidate keys belonging to that particular party, the keys themselves and parts operated thereby, may be shifted independently of the straight ticket mechanism. It should also be noted that the straight ticket bars 63 are parallel-movement bars, that is to say, they are at all times parallel to the rows of pins or rock-shafts 42, so that the latter will be properly operated to shift all of the counter actuators belonging to a party group when the straight ticket key belonging to that party is operated.

The limiting mechanism for preventing the voter from pushing in more than a certain number of the candidate keys, comprises a series of wedge-block separators controlled by the keys and grouping mechanism. Each of the candidate group sections or units is provided with a series of wedge-blocks 72 (see Fig. 10) which slide upon the bottom of the section in contact with the rear wall thereof. Each section has one more wedge-block than it has keys and the wedge-blocks are cut away at their forward, adjacent edges to form spaces 73 which receive the separator pins 74. These separators are connected by links 75 to pins 57, extending through the slides 46 in rear of the keys 45. The cut-away portions of the blocks froming the spaces 73, are beveled or inclined at their rear ends so that the separators 74, whenever the corresponding key is actuated, will be forced between the adjacent blocks to elongate the series of blocks. The connecting links 75 permit the movement of the blocks and separators 74 transversely of the keys without changing the relation between the separators and wedge-blocks. Obviously it is only necessary to limit the movement of the first and last blocks of any series of blocks in one or more of the candidate group sections to limit the number of keys which can be actuated. If the movement of the series of blocks is limited to one step, i. e. to the diameter of one of the separators 74, one key only can be pushed in. If it is limited to two steps, two keys can be pushed in and so on. In the arrangement shown, the center block of the series in each unit or section is fixed in position by pins or studs 77, (see Fig. 10). One end block is provided with a lug 78 which engages a notch in the end of a sliding bar 78. Bar 79 slides upon the bottom of the section between the front edges of the blocks 72 and the rear edge of the actuator rack-bar 31. The block at the other end of the section is pivoted to the center of a horizontal link 80, which is slotted at its forward end to engage a pin 80′ on the end of bar 79. The rear end of the link 80 projects through a slot in the rear wall of the section and is connected to the means by which the movement of the blocks is limited. If one or more of the separators to the left of the center fixed wedge-block are pushed in, the bar 79 will move the link 80 one or more steps in accordance with the number of separators so operated. If the separators at the right of the fixed block are pushed in, the right hand end block will move the link 80 one or more steps in accordance with the number of separators pushed in, and it would move the link in the same direction as the latter is moved by the bar 79. By this arrangement the extent of movement of the individual blocks and separators transversely to the keys, is considerably cut down. For example, in Fig. 10 four separators are shown and if all are pushed in, the link 80 will be moved four steps, but no one block will have moved more than two steps. By reason of this arrangement, the links or arrows 75 which connect the separators with the keys and which compensate for the transverse movement of the separators relatively to the keys, can be much shorter than they would have to be if one of the blocks of the series moved as many steps as there were separators when all of the separators were pushed in. It will of course be understood, that unless the section is arranged in a multicandidate group, the movement of link 80 is limited to one step so that this arrangement is only of particular advantage when the section or unit is to be arranged in a multicandidate group. But it is important that all of the sections should be so connected that they can be placed or assembled with other of the units in a multicandidate group, as may be desired.

Each link 80 is connected to one of the limiting bars 81 of the grouping mechanism, preferably by means of an adjustable connection comprising a link 82 which is pivoted to the rear end of the link 80 and which is provided with a slot arranged to receive a pin 83 connected to the ends of the sections of the limiting bar 81. An adjusting screw 84 extends longitudinally through the link 82 and engages the cross-pin 83. Each bar 81 is as stated, preferably formed of separate sections which extend across the rear face of the machine and on opposite sides of a guide frame 85 secured to, but spaced from the rear face of the machine. See Fig. 11. This guide frame comprises the horizontal bars 85 through which the supporting screws 86 extend, and the pairs of vertical bars 87 secured to the ends of the horizontal bars 85. Between the bars 85 are arranged the space or guide bars 88, which are narrower than the vertical bars 87 so that guide slots are formed to receive the overlapping limiting plates 89. These limiting plates are triangular in outline as shown, and are provided with squared ends which abut snugly against the guide bars 88 and the plates can therefore only shift in a vertical direction within the guide frame. Removable pins 90 extend through the bars 87 and limiting plates 89 and hold them in the position shown in Fig. 11. The sections of each of the limiting bars 81 are connected by a cross-pin 91 which extends between two of the limiting plates and engages the inclined edge of the lowermost limiting plate. The machine is provided with one more of the limiting plates 89 than it has candidate group sections, so that the pin 91 on each of the several limiting bars 81 which correspond in number to the candidate group sections, coöperates with two of the limiting plates. If the plates 89 on opposite sides of any one of the pins 91 are fixed in position, that pin will be arrested by engaging the lower edge of the plate above it when the space blocks and limiting bar 81 of the corresponding unit or section, have been moved one step. When any of the candidate group sections or units are to be used for a single office, that is to represent an office to which but one candidate may be elected, the plates on the opposite sides of the end of the corresponding limiting bar 81, are fixed in position. By properly adjusting the connection between the bar 81 and the link 82, the movement then permitted can be nicely regulated to a single step so that but one of the several keys and separators of the unit or section can be pushed in, and but one vote recorded for the office represented by the section. But it often occurs that there are offices to which there are several persons to be elected, and such conditions necessitate multicandidate groups. That is, several of the office rows or units must be coupled together to permit a voter to cast all of his ballots for the candidates named in a single row, or to vote the straight ticket or otherwise cast his vote. For this purpose, any of the limiting plates 89 may be unlocked by removing the pins 90. If the top and bottom plates alone are held in position while the intermediate plates are unlocked, the whole machine will be thrown into a multicandidate group and the voter may push in as many keys as there are office units or office rows, and he may bunch all of his votes in a single row, vote a straight ticket or cut up his ballot in any desired manner. Usually however, it is not necessary to use the whole machine as a multicandidate group. Most of the units ordinarily will represent but a single office and the limiting plates on either side of the bars 81 corresponding to the single office groups, will be locked in place by the pins 90. Where a few adjacent units or sections are thrown into a multicandidate group, the limiting plate below the bar 81 of the lowermost section of the group and the plate above the bar 81 of the uppermost section of the group, will be locked while the intermediate plates are left free. The voter may then push in as many keys in the multicandidate group as there are sections or office rows thus arranged in the group, and these votes may be distributed within the multicandidate group in any desired manner.

To prevent interference with the limiting and grouping mechanism and other parts on the rear face of the machine, these parts are inclosed in a casing 6 carried at its upper edge on pins 93 and secured in place at its lower edge by a lock 94, so that only the city clerk or other proper official having the key to the lock 94, can have access to the limiting mechanism for properly adjusting or setting the same prior to an election.

The sections of the limiting bars 81 extend on opposite sides of a pair of vertically disposed parallel movement bars 95 and 96. These bars are pivotally connected at their ends to links or bell levers 97 and 98. These links are carried intermediate their ends on pivots 99 and 100 which are mounted respectively in the sections 3 and 4 of the machine. The link 98 is fixed to the pivot 100 and the rear end of the latter is arranged opposite an opening in the cover-plate 6 and has a squared portion adapted to receive a suitable key by which the judge of election may shift the bars 95 and 96. Bar 96 is arranged to engage and coöperate with a series of pins 101 extending between the sections of the limiting bars 81 to lock the bars and spaceblocks connected thereto against movement with the bar 96 in the position shown in dotted lines in Fig. 11, and with all of the pins 101 in place, none of the voting keys can be pushed in. When special class electors are to vote for certain offices, the pins 101 of the limiting bars 81, connected to the sections or units representing these offices, are removed. When a special class voter is to cast a ballot, the judge of election will shift the class-bar 96 into position shown in dotted lines in Fig. 11, and this will lock all of the keys of the machine except those representing the offices to which the special class elector is entitled to cast a ballot. The bar 96 is cut away or notched at its upper end so that the pivots at its ends may be brought in line above the pivots 99 and 100, and the weight of bar 95 will securely hold the bar 96 in this normal position, shown in full lines in Fig. 11 so that there is no danger that it will be accidentally shifted to lock the machine.

Means are provided for controlling the casting of free ballots for irregular candidates whose names are not on the machine. Such means consists of devices by which a free ballot may be so marked as to indicate the offices for which the elector has a right to cast a free ballot. That is to say, the free ballot is so marked as to identify those offices for which the voter has not cast a ballot for one of the regular candidates whose names appear upon the face of the machine. These devices are so connected to the limiting mechanism that this object is attained. Preferably, printers bearing identifying numerals, names or other marks corresponding to the several offices are employed. These printers are actuated by suitable keys and their operation is controlled by the locking and limiting mechanisms.

Each of the sections or units is provided at its end with a plate 103 which is riveted thereto and which is provided on its inner face with a cut-away space 104 and on its outer face with a clip 105. The plates 103 are of the same width as the separate sections of the machine and when the sections are set one upon the other, the cut-away spaces 104 form a continuous slot (see Fig. 21) which receives a holder 106. This holder is provided on its upper end with an out-turned clip 107, which supports the holder in place. A plate 108 having prongs on its upper edge, is secured to the inner face of the holder 106, and the wires 109 secured to and depending from the holder, are provided on its lower ends with prongs. An inking ribbon 110 is stretched between the prongs of the plate 108 and the prongs on the lower ends of the wires 109 are so held in place within the cut-away spaces 104. The free ballot is placed by the voter within the clip 105 and each section or unit is provided with a printing plunger or head 111 arranged to shift through openings 112 in the end of the section and in the plate 103, and thus force the inking ribbon 110 against the free ballot to impress the identifying number or other mark upon the free ballot. Each of the printing heads bears its own particular identifying number, name or other mark which corresponds to the candidate represented by the unit or section in which the plunger is mounted.

The plunger is carried in a block 113 arranged between a pair of plates 114 which are secured to the bottom of the section in front of the end of the actuator-bar 31. The front edge of the actuator-bar 31 engages the rear plate 114 so that the end of the bar is guided by the plate.

The counter at the extreme right hand end of the section registers the number of times that the free ballot printer is operated, and is in all respects similar to the counting mechanism previously described, except that a rocking-key 115 (see Figs. 1 and 15) is employed instead of a push key. This rocking key is mounted upon the cross-pin 42 and is arranged to operate the cam 60 thereon to move the slide 46, actuator 47 and separator 74 connected thereto. The cam and pin in the other counting mechanism are connected to the straight ticket bars which are not employed in the free ballot mechanism. The pin 45′, which carries the actuator 47 of the free ballot register, does not extend through the front of the casing to form a push key as in the other counting mechanisms.

The pin or rock shaft 42 of the free ballot mechanism carries an actuating shifter for the printer in the form of a cylindrical piece 116 (see Figs. 15, 16 and 17), having a slot 117 in one side and a projecting V-shaped piece 117′ which in normal position engages the bottom of the section or unit and limits the movement of the printer actuator in one direction. A slide 118 shifting longitudinally between the plates 114, carries a cross-pin 119 upon which is mounted an arm 120. One end of the arm is connected by a pair of links 121 to the end of the reciprocating printer head 111 and the other end extends within the slot 117 of the shifter 116 above an abutment 122 at the lower end of the slot. The sliding block 118 carries a pin 123, to which is pivoted a bell-crank 124. One arm of the bell-crank is slotted at its end to engage a pin 125 on the end of the restoring-bar 32. The other arm of the bell-lever 124 is provided with a cam-shaped slot 126, which engages a pin 127 on a plate 128, which is secured in fixed position to the plates 114. The cross-pin 119, which carries the shifter 120 in the slide 118, projects through guide slots 129 in the sides of the plates 114 (see Fig. 17). The shifter 120 is provided on its lower edge with a lug 130 which is arranged to engage a fixed cross-pin 131 extending between the plates 114.

As the elector enters the booth, the locking or restoring bar 32 is shifted to the left, as described, to release the slides and keys of the several registering mechanisms including that belonging to the free ballot devices. At the same time the bell-lever 124 is shifted about its pivot. During this shift the cam-slot 126 of the bell-lever coöperates with the fixed pin 127 to move the pivot pin 123, slide 118 and arm 120 toward the right or toward the printing head 111 as shown in Figs. 15 and 16. If the elector desires to cast a ballot for an irregular candidate for any office, he will operate the free ballot key corresponding to that office. This will turn the shifter 116 toward the left and the engagement of the abutment 122 thereon with the end of the arm 120 will project the printing head 111 and the free ballot within the clips 105 will be thus printed with an identifying mark representing the office for which the elector has a right to vote. This operation of course shifts the separator connected to the free ballot mechanism between the wedge-blocks of the limiting mechanism so that the elector cannot cast another vote for the same office by operating any of the regular keys. Of course the free ballot mechanism may be arranged in a multicandidate group and then the elector may cast as many ballots either regular or irregular, as there are office rows or sections arranged in the group. When in multicandidate group the ballots which are to be marked by the printing mechanism should be of a size sufficient to fit within the clips 105 connected to all of the units or sections in the group. Where the sections represent single candidates only, small clips may be employed. After the free ballots have thus been printed with an identifying number or other mark, the elector may write thereon the name of the irregular candidate for whom he desires to cast a ballot and the ballot is then placed within a suitable box. It will be understood of course, that no free ballots will be counted unless they have been properly marked with the printing mechanism.

As the printer is operated by the engagement of the abutment 122 with the tail of the arm 120, the toggle formed by the shifter 120 and the links 121 is moved past its line of centers and the movement of the shifter 116 is arrested by the engagement of the abutment 117 thereon with the lower edge of the arm 120. By this movement of the parts 120 and 121 past their line of centers, the printing head is projected and then withdrawn. It is obvious however, that it cannot again be operated by any further manipulation of the key 115 or actuator 116. As the operator leaves the booth, the restoring bar 32 is shifted toward the right and bell-lever 124 is swung back about the pin 123 so that the cam 126 and pin 127 coöperate to move the slide and shifter back toward the left. This movement brings the lug 130 on the shifter into engagement with the fixed pin 131 so that the shifter is turned from its lowermost position into which it has been moved by the shifter 116 back to its uppermost normal position shown in Fig. 16. During this restoring movement of the shifter, the printing head 111 is of course projected toward the right and withdrawn, but it is not projected far enough to again mark a ballot, since, during this restoring movement, the pivot 119 of the shifter is at the inner end of the slot 129 and the slide 118 and arm 120 are drawn away from the right hand end of the section or unit. The parts are so arranged that it is only when the pin 119 and shifter 120 are in their extreme, outermost position that the printing head will be projected far enough by the shift of the toggle members 120 and 121 past the line of centers to mark the ballot.

The openings 36 in front of the sections of the machine and through which the count of the several voting mechanisms is displayed, are covered during an election by party group plates 132 (see Figs. 1 and 20).

These plates are notched at their upper ends to engage buttons 133 fixed to the top section 5 of the machine. At their lower ends, the plates are provided with horizontal slots 134 through which projects the T-shaped heads 135 carried on the base section 1. These heads are fixed to cross shafts 136 (see Figs. 23, 25 and 29) which are journaled in the base section and which are connected together for simultaneous shift by a longitudinal parallel movement bar 137. This bar is provided with openings 138 through which shafts 136 extend, and it is connected to the shafts by a series of links or rock-arms 139 of uniform length. A shifting-arm 140 is connected to one of the shafts and projects through a slot 141 in the bottom of the lower section 1. The movement of the shaft 136 and heads 135 is limited by the engagement of the arm 140 with the edges of the slot 141. In one position the heads are horizontally disposed as indicated in dotted lines in Fig. 2. The name-plates 132 may then be put in position or removed therefrom to expose the count. In the other extreme position, the T-heads 135 are vertically disposed, as indicated in full lines in the drawings, and the plates are locked in position.

The handle 140 is provided with a quadrant shaped inner end 142 having slots 143 to receive the loop of a pad-lock 144. In either extreme position, one of the openings 143 is just below the bottom of the base and by inserting the pad-lock 144 the arm 140 may be locked in either of its extreme positions. The judges of election are given the key to the lock 144 so that the count may be exposed when the polls are closed.

The plates 132 are preferably provided with heads 145 on their lower ends which are hollowed out to receive the locking T-heads 135, and which are provided with handles or knobs 146 for convenience in shifting the plates to and from position. On the faces of these plates are written or printed the party tickets and the names of the regularly nominated candidates. The free ballot name-plate simply bears the name of the officers to be elected opposite the respective keys. At the extreme left of the machine is the office name-plate 147 which engages a button 148 at its upper end and is provided with a vertical slot to receive a perforated lug 149 on the lower section 1 of the machine. A lock 150 holds the office name-plate in position. This lock is under control of the city clerk or other official having entire charge of the election, so that the office name-plate 147 can only be removed by such officer.

Suitable means have been heretofore provided whereby the counters are automatically locked against further movement as soon as the plates 132 are removed to expose the count or to afford access to the counting mechanisms. This automatic locking mechanism, if operated by the exposure of the counters, can only be re-set to permit further operation of the machine by removing the city clerk's lock and office plate 147. In accordance with the present invention however, this automatic lock is so arranged that it can be released or re-set before the machine has been operated. This improvement enables the judges of election to expose the registers when the polls are open and satisfy the party representatives that the counting mechanisms are all at zero. The judges of election may then restore the plates and set the machine in operation. When however, the plates are again removed to expose the count, the automatic lock is actuated to prevent further operation of the machine and cannot again be reset, except by the removal of the city clerk's lock and office plate. This feature of the invention is believed to be broadly new and is not limited to the particular form next to be described.

The motor shaft 26 extends within the end of the base section 1 and a sleeve 151 within the section is fitted to the shaft and is provided with a reduced, lower end set within a socket plate 152 (see Fig. 25) so as to hold the lower end of the shaft against side shift. A block 153 (see Figs. 23 to 26 inclusive) set within the base section adjacent the sleeve 151, carries a longitudinally sliding bolt 154 which is arranged to engage a slot 155 in the sleeve 151. This bolt is opposite the end of the parallel movement bar 137 and is projected within the slot 155, when the bar is shifted to release the name-plates, and thus prevent further operation of the motor devices and counting mechanisms. This bolt is provided with an upwardly projecting portion 156 having a V-shaped cam face 157 at one end. A trip 158 for the lock (see Figs. 23, 25, 27 and 28) is arranged to shift transversely (i. e. from front to back of the machine) in a slot or guide-way 159 in the block 153. This trip is provided with a downwardly projecting portion 160 having a V-shaped cam face 161 which coöperates with the cam face 157 of the bolt to release it when the trip is moved in either direction. A shifter 162 for the trip 158 is guided in a slot 163 in the upper face of the block 153, and has a projecting lug 164 which extends behind the trip 158. The front end of the shifter 162 is behind the office plate 147 so that it can only be manipulated by the city clerk. The trip 158 is normally, and during the operation of the machine, is in its rearward position so that when the bar 137 is shifted to release the name-plates and expose the counts, the bolt 154 will be actuated to lock the machine and the bolt can only be released by the city clerk or other proper official having the key to the pad-lock 150. When the machine is sent to the polling place however, the trip 158 is set by the city clerk in its forward position, as shown in Fig. 26. The judges of election may then, before the machine is put into operation, shift the bar 137 to permit the removal of the name-plate, as often as may be desired or is necessary to show that the registers are all at zero. When the bar 137 is thus shifted for this purpose, the locking bolt is of course projected within the slot 155 of sleeve 151, but when the machine is to be set in operation the judges of election may release this bolt inasmuch as there are openings 165 in the front wall of the base section 1 and in the office nameplate 147 (see Figs. 1 and 26), through which a pencil or other device may be inserted to push the trip back to its rearmost position. This backward shift of the trip from the position shown in Fig. 26 to that shown in Fig. 23, will release the locking bolt 154 and the balloting for candidates may then proceed. But when the judges again operate the bar 137 to expose the count, the lock cannot be again released, inasmuch as the shifter 162 for moving the trip to its forward position is inaccessible and can only be operated by the city clerk or other proper official having control of the election.

Preferably, the locking bolt is provided with indentations 166 adapted to receive a spring-actuated stud 167 so as to hold it against accidental shift, either in its release or locking position (see Figs. 25 and 28).

The several actuator bars 31 are provided at one end with lugs 168 (see Figs. 2 and 12) which project through longitudinal slots 169 in the front walls of the sections and these studs are arranged to engage the vertically disposed rib 170 on the rear face of the office name-plate 147 (see dotted lines in Fig. 2 and full lines in Fig. 19). The engagement of the studs 168 with the left hand ends of the slots 169, limit the forward movement of the actuator bars as the voter enters the booth or approaches the machine. The engagement of the studs with the rib 170 on the office name-plate limits the return or counter-actuating movement of the bars 31 as the elector retreats from the machine, and this rib thus prevents excessive movement of the actuator bars. When the plate 147 is removed by the city clerk, the actuator bars may then be shifted to bring the lugs 168 thereon into engagement with the extreme right hand ends of the slots 169. In this position the mutilated portions 54 in the actuator sleeves 47 will be brought opposite the locking wheels 52 of the counters and the counters may then be restored to zero position with the suitable handle or tool fitted on the forward squared ends of the pins 42, which carry the units sleeves of the counters. It is obvious that normally the counters are locked in the position to which they have been shifted by the actuators and cannot be restored to zero position, except after the city clerk's lock and office plate have been removed.

A total counter is arranged in the top section 1 of the machine and operates with the booth devices to show the number of voters. For this purpose, the central shaft 11 which carries the booth frame, is provided on its lower end with a beveled gear 171 meshing with a corresponding gear 172 on a short shaft 173 journaled in depending lugs on the bracket 16. A spur-gear 174 is connected to or formed in piece with the beveled gear 172 and meshes with the teeth of a spur-gear 175 on a sleeve 176. The sleeve 176 is loosely mounted upon the central one of a series of short shafts 177 which are journaled within the front and back plates of the top section 1. These shafts carry the dials 178 of the total counter and each of the dials is provided with ten numerals which are exposed through openings 179 in the front of the top section (see Figs. 1 and 2). The units and tens shafts are provided with single tooth actuators 180 which engage intermittent gears 181 on the tens and hundreds shafts, respectively. The tens and hundreds shafts are provided with locking wheels 182 which engage locking disks 183 on the units and tens shafts, said disks being mutilated opposite the actuating teeth 180. The sleeve 176 is provided with a single tooth-actuator 184, which engages the intermittent gear 185 on the units shaft and the units shaft is provided with a locking wheel 186 which engages a locking disk 187 which is fixed to the sleeve 176 and is provided with a mutilated portion opposite the tooth 184. It is obvious that these shafts and dials are normally locked in the position to which they have been shifted by the several actuators. Sleeve 176 however, is longitudinally shiftable to the dotted position shown in Fig. 7, so as to disengage the locking disk 187 from its companion wheel 186 and thus permit the turning back of the counter to zero. This shift is effected by a horizontal lever 188 pivoted to a cross piece 189 and having on one end a pair of lugs 190 (see Fig. 8) arranged on opposite sides of the spur-gear 175 on the sleeve 176. The opposite end of the lever is connected to a pin 191 which extends forwardly through the front wall of the top section 5, and is provided on its forward end to the button 192 by which the lever 188 may be operated to engage and disengage the locking disk 187 and locking wheel 186. This button however, is normally behind and rendered inaccessible by the office name-plate 147 so that the total counter can only be re-set to zero position after this plate has been removed by the city clerk or other proper official.

At the polls, the face of the machine is normally exposed, that is to say, the curtain is swung into the position indicated in full lines in Fig. 3. At the same time all of the locking and restoring bars 32 will be in their forward positions; the keys in their outer positions and the actuators turned away from the counters. An elector upon approaching the machine, turns the booth frame by means of the handles 15, thus moving the motor shaft and sleeves 27 thereon through a half revolution. Tappets 29 on the sleeves first shift the actuator bars to rotate the actuators into position so that they may shift the counters on their return movement if pushed in by the controlling keys. The movement of the sleeves 27 through the tappets 30 subsequently throws back the locking and returning bars 32 and releases the voting keys. The voter concealed in the booth then pushes in the keys for the candidates of his choice, thus positioning the actuators for operation upon the counters and forcing the separators between the blocks of the limiting mechanism until the limit of each section of the limiting mechanism is reached. Then the voter will find it impossible to operate further keys unless he first retracts some of the keys first pushed in. If the voter desires, he may use one of the straight ticket keys thereby voting the entire column of individual keys beneath it. After so voting, he may retract the straight ticket key and any of the individual keys that he wishes and may then vote corresponding individual keys in the same office rows or multicandidate groups. He may in the same way use the keys of the free ballot mechanism and print identifying marks on the ballot to show the offices for which the elector has not voted any of the regular candidates named on the face of the machine. He may then write upon the ballots the names of any irregular candidate or person for whom he may desire to vote. Having finally completed his ballot the voter completes the revolution of the booth and motor shaft, thus first returning the actuator bar and operating counters corresponding to the keys which have been pushed in and finally returning the restoring and locking bar to move out all of the keys. When the polls are closed, the judge of election removes the pad-lock 144 and shifts the bar 137 to release the name-plates and expose the count. This movement as described, locks the machine against further operation.

When it is desired to prepare the machine for the next election, the city clerk or other proper official unlocks the machine by removing the pad-lock 150 and office name-plate 147 and the pad-lock 94 and back plate 6. When the name plate is removed the actuator bars 31 may be shifted, as described, to lock the counting mechanisms which may then be restored to zero position. The button 192 may be pulled out to release the total counter and the same is then returned to zero position. The machine is then made up with the proper number of units or sections and the group plates and party name-plates made in accordance with the requirements of the election are put in place. The grouping mechanism is properly arranged by removing such of the pins 91 as is necessary to throw certain of the sections into multicandidate groups and such of the pins 101 of the limiting bars 81 are removed as is necessary to set the machine for class voting. Before the office name-plate is set in position, the shifter 162 is operated to move the trip 158 to its forward position and the machine is then locked up. Before the election commences, the judge may remove the party group plate to show that the counters are all at zero. In prior machines this could not be done without unlocking the machine with the city clerk's key, but after the election the count can only be exposed, as described, by permanently locking the machine out of operation.

It is obvious that numerous changes may be made in the details of structure set forth without departure from the essentials of the invention.

Having described my invention, what I claim as new and desire to secure by Letters Patent is:—

1. In voting machines, the combination with a series of counters, actuators therefor and actuator shifters, of a return-bar for said shifters, an operating bar for said actuators and motor means for said return and actuating bars, comprising a shaft rotatable in one direction only and means for rotating said shaft as the voter advances and retreats from the machine.

2. In voting machines, the combination with the counters, key-controlled actuating means and locking and restoring means for said counters, of a counter shaft for shifting said actuating means and said locking and restoring means, and means for compelling the rotation of said shaft in the same direction as the voter advances and retreats from the machine.

3. In voting machines, the combination with the counters, counter actuators and actuator shifters, of return-bars for said shifters, actuating bars for said actuators, a motor shaft for reciprocating said bars rotatable in one direction only and bar-operating means on said shaft arranged to shift said actuating-bar in advance of said return-bar.

4. In voting machines, the combination with the counters, push keys and rotary actuators, of return-bars for said keys, actuating-bars for said actuators, a motor shaft for reciprocating said bars rotatable in one direction only and bar-operating tappets carried by said shaft, the actuating-bar tappet being arranged in advance of said return-bar tappet, whereby the actuating-bar is shifted first, both when the voter advances and when he retreats from the machine.

5. In voting machines, the combination with the upright frame carrying the voting keys on its face, of a booth forming shield centrally journaled upon said frame and rotating in one direction only about said frame, a shaft rotated by said shield, and a counter constantly interlocked with said shaft and operated thereby.

6. In voting machines, the combination with the upright frame carrying the voting keys on its face, of a booth forming shield centrally journaled upon said frame and rotating in one direction only about said frame, a shaft rotated by said shield, a Geneva-movement counter and a Geneva-movement actuator for said counter geared to said shaft.

7. In voting machines, the combination with the frame, counters and key-controlled actuating means, of a motor shaft for said actuating means journaled in said frame, means for checking the rotation of said shaft in one direction, and a counter constantly interlocked with and operated by said shaft.

8. In voting machines, the combination with the frame, counters and key-controlled actuating means, of a motor shaft for said actuating means journaled in said frame, means for checking the rotation of said shaft in one direction, a counter, gears connecting said counter and said shaft, a shifter for disengaging said connecting gears and a lock for said shifter.

9. In voting machines, the combination with the frame, counters and key-controlled actuating means, of a motor shaft, a counter, gears connecting said counter and shaft, a shifter for releasing said gears and means for locking said shifter in position with the gears in mesh.

10. In a voting machine, the combination with a frame, two or more candidate groups of counters and key-controlled actuating means for each group, of a common shaft for the actuating means of the several groups extending vertically through the frame at one end thereof, a stub shaft centrally and vertically journaled in the top of the frame and connected to said first mentioned shaft, a pawl and ratchet for preventing the movement of said shafts in one direction, a cross-bar centrally secured to said stub shaft and a booth-forming shield carried by said cross-bar.

11. In a voting machine, the combination with the frame formed of sections placed one upon the other and rows of counters and counter actuators in each of said sections, of a common motor shaft for said actuators extending through said sections at one end, an upright stub shaft centrally journaled on the top section, a gear at one end of said section connected to said stub-shaft, detachable interlocking parts on said gear and on the upper end of said motor shaft and a booth-forming shield carried by said stub-shaft.

12. In a voting machine, the combination with a series of counters, of actuators therefor, common operating means for a number of said actuators acting by excessive movement to free the same from said counters so that the latter may be returned to zero, a stop for preventing excessive movement of the actuator operating means and a lock for releasably holding said stop in position.

13. In a voting machine, the combination with a series of counters, of key-controlled actuators therefor normally interlocked therewith, a common operating bar for a number of said actuators, means for imparting a limited shift to said bar, a stop for preventing excessive movement of said bar, a lock for releasably holding said stop in position and means whereby the excessive movement of said bar will free said actuators from their counters so that the latter may be returned to zero.

14. In a voting machine, the combination with a counter, of a counter actuator, an operating key for said actuator, said actuator being shiftable with said key in one direction and movable independently thereof in another direction, and said actuator being normally interlocked with said counter, but freed therefrom on excessive movement independently of its key to permit the return of the counter to zero position, and a normally locked stop for preventing such excessive movement of the actuator.

15. In a voting machine, the combination with the frame, of two or more candidate groups or rows of counters, a key-controlled actuator for each counter normally interlocked therewith but releasable therefrom on excessive movement, a reciprocating operating bar for each group of actuators, means for imparting a limited throw to said actuating bars and a normally locked stop for preventing excessive movement of said actuating bars.

16. In a voting machine, the combination with a group of counters, of individual key-controlled actuators for said counters normally interlocked therewith but releasable therefrom on excessive movement, a common operating bar for said actuators, an abutment on said bar extending through a slot in the machine frame and a plate removably locked upon the machine casing over said lug and having a stop on its rear face coöperating therewith to prevent excessive movement of said operating bar and said actuators.

17. In a voting machine, the combination with two or more rows or groups of counters, of individual actuators for said counters normally interlocked therewith but releasable therefrom on excessive movement, an operating bar for each group of actuators, means for effecting the limited movement of said operating bars and a plate removably locked on the machine casing provided with a stop coöperating with said bars to prevent excessive movement thereof.

18. In voting machines, the combination with two or more rows of voting mechanisms representing different party tickets and with the individual reciprocating shifters controlling the operation of said voting mechanisms, of a series of rock shafts, cams on said shafts arranged to engage said shifters, rock arms on said shafts and a common straight ticket bar for each row engaging said rock arms.

19. In voting machines, the combination with two or more rows of vote registers representing different party groups, of cross pins journaled in the machine frame whereon said registers are mounted, slides mounted on said cross pins, register actuators and controlling keys connected to said slides, cams on said pins engaging said slides, rock arms on the ends of said pins, a series of parallel-movement, straight-ticket bars connected to said rock arms and straight ticket keys for operating said bars.

20. In a voting machine, the combination with a series of units or sections and a series or office group of voting mechanisms in each of said sections, said voting mechanisms being arranged in rows or groups representing different party tickets, of a straight ticket section, straight ticket keys and rock shafts carried thereby, a series of sliding shifters controlling the operation of said voting mechanisms, cross shafts or pins whereon said shifters are mounted, cams on said pins engaging said shifters, rock arms on the rear projecting ends of said pins and a series of parallel movement bars connecting said rock arms with the rock shafts of said straight ticket section.

21. In a voting machine, the combination with a series of units or sections and a series or office group of voting mechanisms in each of said sections, said voting mechanisms being arranged in rows or groups representing different party tickets, of a straight ticket section, straight ticket keys and rock shafts carried thereby, a series of sliding shifters controlling the operation of said voting mechanisms, cross shafts or pins whereon said shifters are mounted, cams on said pins engaging said shifters, rock arms on the rear projecting ends of said pins, arms on the rock shafts of said straight ticket section, bell levers journaled on the said straight ticket section, links connecting said bell levers and arms, and a series of parallel movement bars connecting said bell levers with the rock arms of said office group sections or units, said parallel movement bars being secured to the rock arms of the lower section or unit and having pins engaging open-ended slots in the rock arms of the other of said units.

22. In voting machines, the combination with normally inaccessible vote registers, of means for locking said vote registers against operation when exposed to disclose the vote, said locking means being normally non-releasable but admitting access to said vote registers before balloting commences without non-releasably locking the same.

23. In voting machines, the combination with the normally concealed counters, of means shiftable to expose the same, a lock, normally non-releasable for holding said counters against operation and devices co-operating with said parts compelling the setting of said lock when access is afforded to said counters after they have been operated, but permitting access thereto before balloting commences without non-releasably locking the same.

24. In voting machines, the combination with normally inaccessible vote registers, of means for locking said registers against operation and means compelling the setting of said locking means before the registers can be operated in position to non-releasably lock the registers when exposed after such operation.

25. In voting machines, the combination with the normally concealed counters, of means shiftable to expose the same, a lock for holding said counters against operation, a shifter for said lock, means compelling the setting of said shifter in such position before said counters can be operated, that the counters will be non-releasably locked against operation when exposed to disclose the vote.

26. In voting machines, the combination with the normally concealed counters, of means for compelling the locking of said counters against operation when exposed, and means associated with said locking devices whereby said counters may be exposed, locked and released before balloting commences, but whereby they are held non-releasably locked when exposed to disclose the vote.

27. In voting machines, the combination with the normally inaccessible vote registers, of means for compelling the locking of said vote registers against operation when access is afforded thereto and means for releasing said locking means, said releasing means being only operable before said registers have been actuated.

28. In voting machines, the combination with the normally inaccessible vote registers, of means for locking said registers when access is afforded thereto, a releasing trip for locking said means and means compelling the shift of said releasing trip to an inaccessible position before said registers can be operated.

29. In voting machines, the combination with the normally inaccessible vote registers, of a lock, normally non-releasable for holding said registers against operation, of devices associated with said parts permitting access to said registers without non-releasably locking the same before they have been operated, but arranged to compel the setting of said lock in position to non-releasably hold the registers against operation when access is afforded thereto after they have been operated, a city clerk's lock and means under control of the city clerk's lock for resetting said first mentioned lock.

30. In voting machines, the combination with normally concealed counters, of a lock, normally non-releasable for holding said counters against operation and devices co-operating with said parts arranged to permit the exposure of the counters before they have been operated without non-releasably locking the same, but arranged to non-releasably lock said counters against further movement when exposed after operation, a city clerk's lock and means under control of said city clerk's lock for resetting said register lock.

31. In voting machines, the combination with normally inaccessible vote registers, of register operating means, a lock therefor, a releasing trip for said lock, means compelling the setting of said releasing trip in inaccessible condition before said counters can be operated, a city clerk's lock and means under control of said city clerk's lock for resetting said releasing trip.

32. In voting machines, the combination with the counters, counter operating means and counter concealing devices, of a lock for said operating means, a catch device for holding said counter concealing means in place, said catch device being arranged to set the lock for said counter operating means when shifted to release said counter concealing devices, a releasing trip for said lock and means for compelling the shifting of said releasing trip to an inaccessible position before said counters can be operated.

33. In voting machines, the combination with normally concealed counters, of a part shiftable to expose the same, means compelling the locking of said counters against operation when exposed, and a releasing trip for said lock operable once only to permit the operation of the counters, whereby the counters, when exposed after operation, will be non-releasably locked against further movement.

34. In voting machines, the combination with the normally inaccessible vote registers, of means compelling the locking of said registers against operation when access is afforded thereto, a releasing trip for said lock operable once only to permit the actuation of said registers, whereby the registers, when exposed after operation, will be non-releasably locked against movement, a city clerk's lock and means under control of the city clerk's lock for resetting said releasing trip.

35. In voting machines, the combination with the counters, counter operating means and counter concealing devices, of a lock for said counter operating means, devices co-operating with said counter concealing means compelling the setting of said lock when the counters are exposed, a releasing trip for said lock, means compelling the setting of said trip in inaccessible position before said counters can be operated, an office group plate, a city clerk's lock for holding said plate in place and a resetting device for said trip accessible when said plate is released.

36. In voting machines, the combination with a series of counters arranged in groups representing the different party tickets, and with the counter operating means, of a series of shiftable party group plates normally concealing said counters, a catch device for holding said plates in position, a lock for said counter operating means arranged to be set in operative position by said catch device when the latter is shifted to release said plates, means for releasing said lock and means compelling the shift of said releasing means to inoperative position before said counters can be operated.

37. In voting machines, the combination with a series of counters arranged in groups representing the different party tickets, and with the counter operating means, of a series of shiftable party group plates normally concealing said counters, a catch device for holding said plates in position, a lock for said counter operating means arranged to be set in operative position by said catch device when the latter is shifted to release said plates, means for releasing said lock operable once only, a city clerk's lock and means under control of the city clerk's lock for resetting said releasing means.

38. In voting machines, the combination with the counters arranged in groups representing different party tickets and with the counter operating devices, of a series of shiftable office group plates normally concealing said counters, a series of catches for holding said plates in position, an operating shifter for said catches, a lock arranged to be engaged and set in operative position by said shifter when the latter is moved to release said plates, a releasing trip for said lock operable once only, a city clerk's lock and a resetting device for said trip under control of said city clerk's lock.

39. In a voting machine, the combination with the counters and key-controlled actuators therefor, of mechanism controlling the operation of said counters and actuators, mechanism for locking and restoring the same, a motor shaft for successively operating said controlling mechanism and said locking and restoring mechanism, and means for compelling the rotation of said shaft in one direction only, whereby said controlling mechanism will be operated in advance of said locking and restoring mechanism both when the machine is set for operation by the voter and when the voting operation is completed.

40. In a voting machine, the combination with a series of counters and key-controlled actuators therefor, of a reciprocating member for controlling the operation of said actuators upon said counters, a reciprocating member for locking and restoring said counters and actuators, a motor shaft for successively operating said controlling member and said locking and restoring member, and means for compelling the rotation of said shaft in one direction only, whereby said controlling member will be operated in advance of said locking and restoring member both when the machine is set for operation by the voter and when the voting operation is completed.

41. In a voting machine, the combination with a series of normally inaccessible vote registers, of a lock for holding said registers against operation, means compelling the setting of said lock when access is afforded to said registers, a city clerk's lock controlling the resetting of said register lock and means for releasing said register lock, said releasing means being operable independently of said city clerk's lock before said registers have been operated, but not thereafter.

42. In a voting machine, the combination with a series of vote registers and operating mechanism therefor, of a lock for said vote registers, means for compelling the setting of said lock when access is afforded to said registers, and a city clerk's lock controlling the resetting of said register lock, said register lock being releasable independently of said city clerk's lock before the operation of said registers, but not thereafter.

43. In a voting machine the combination of a rotating shaft, a bolt to lock said shaft against rotation, a bar mounted to move longitudinally and operate said bolt, a pivoted handle to operate said bar and move said bolt to lock said shaft.

44. In a voting machine the combination of a rotating shaft, a bolt to lock said shaft against rotation, a bar mounted to move longitudinally and operate said bolt, a pivoted handle to operate said bar and move said bolt to lock said shaft, a series of cranks connected to said bar and oscillated thereby, shafts operated by said cranks, and buttons carried on said cranks.

45. In a voting machine the combination of a rotating shaft, a bolt to lock said shaft against rotation, a bar mounted to move longitudinally and operate said bolt, a pivoted handle to operate said bar and move said bolt to lock said shaft, a series of cranks connected to said bar and oscillated thereby, shafts operated by said cranks, buttons carried on said cranks, and ballot plates controlled by said buttons.

46. In a voting machine the combination of a rotating shaft, a bolt to lock said shaft against rotation, means to operate said bolt in the locking direction, ballot plates controlled by said means, means for moving said bolt in the reverse direction, said means being capable of but a single operation.

47. The combination in a voting machine of counters and counter concealing devices, locking means for locking said counter concealing devices, said means being movable to release said counter concealing devices, operating mechanism for the voting machine, said locking means serving to lock the operating mechanism of the voting machine when moved to unlock the counter concealing devices and leave said operating mechanism locked when moved in the reverse direction, a supplemental device for unlocking the operating mechanism, said device being capable of but a single operation.

JAMES H. DEAN.

Witnesses:
HARRY L. CLAPP,
KATHARINE GERLACH.